United States Patent Office 3,158,338
Patented Nov. 24, 1964

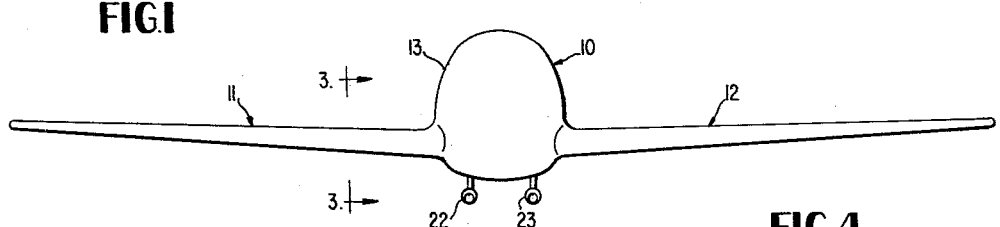
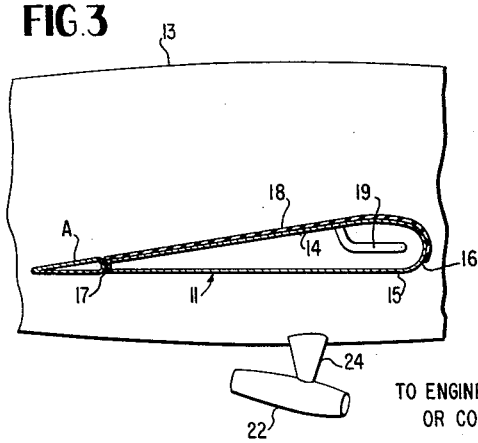
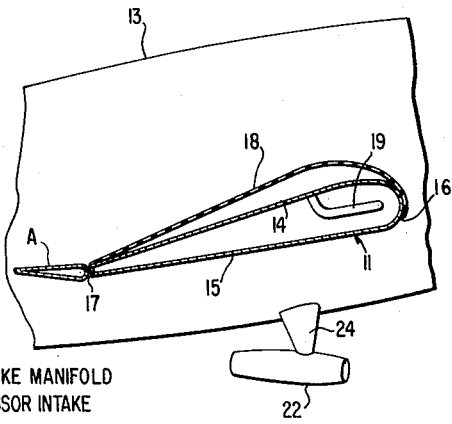
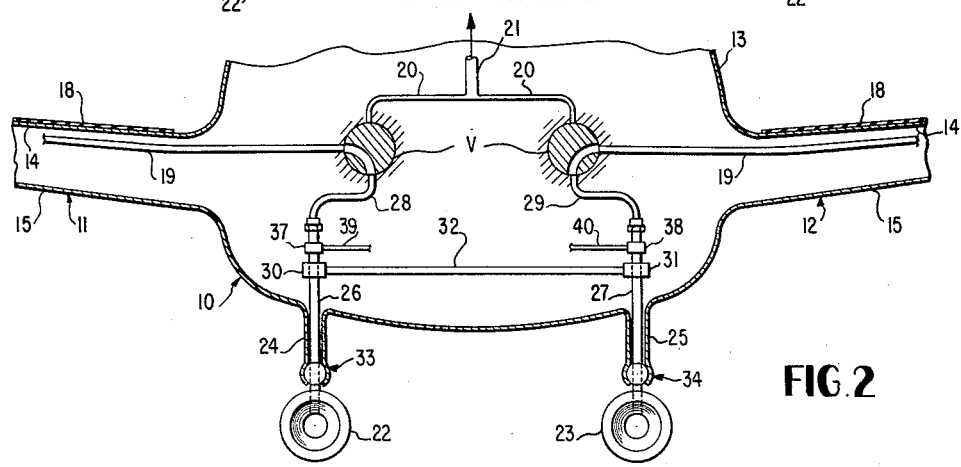
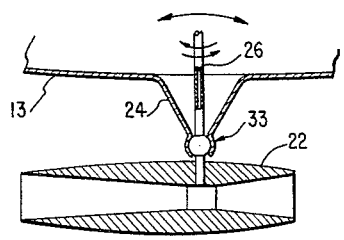
INVENTOR.
WALTON W. CUSHMAN

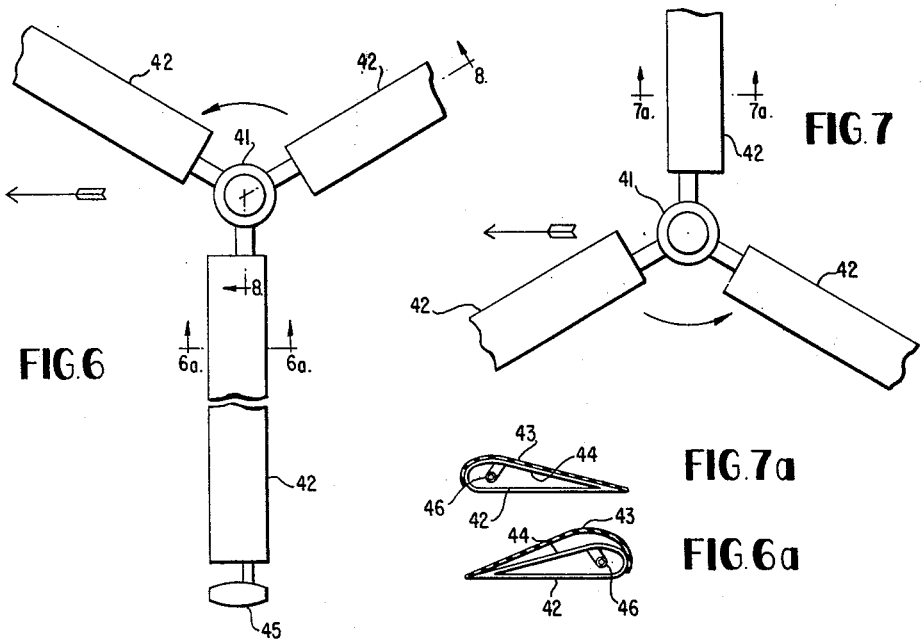
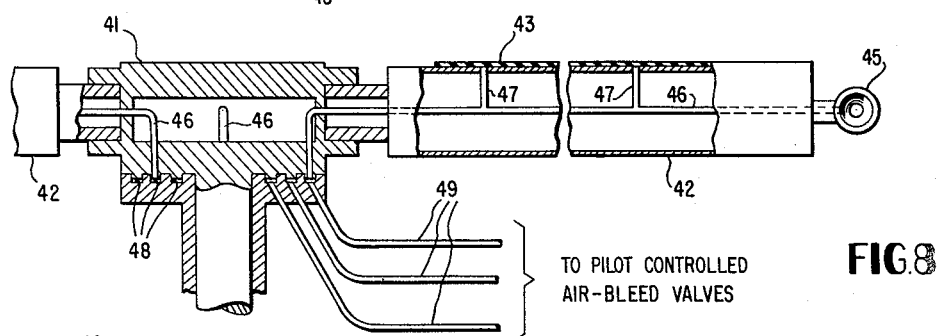
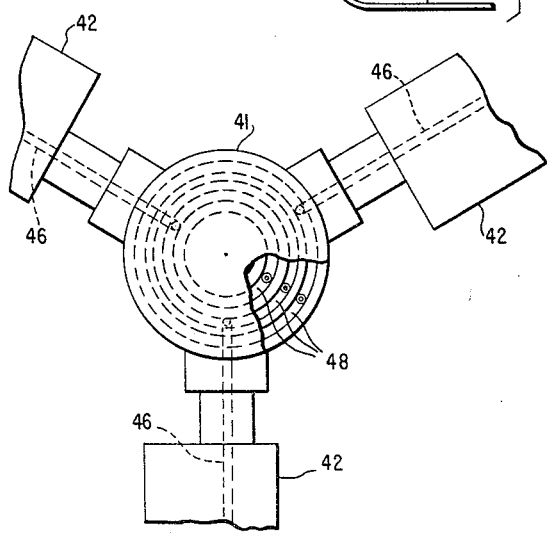
INVENTOR.
WALTON W. CUSHMAN
BY
ATTORNEY

3,158,338
SUSTAINING AIRFOILS HAVING VARIABLE CONFIGURATIONS TO VARY LIFT CHARACTERISTICS
Walton W. Cushman, 401 N. Penn St., Webb City, Mo.
Filed Feb. 18, 1963, Ser. No. 259,136
21 Claims. (Cl. 244—44)

The present invention relates to sustaining airfoils for engine driven aircraft and the like.

More particularly, the invention relates to sustaining airfoils having an aerodynamic cross sectional configuration having a novel structure whereby said cross sectional configuration can be varied selectively to control the lift characteristics of the airfoil.

Many prior attempts have been made to provide aircraft with variable lift airfoil constructions, but most of the prior structures have involved the use of highly complicated arrangements of mechanical linkage and/or expanding and contracting skin surfaces which are inflated by means controlled in some manner by the operator of the aircraft. One such example of prior attempts along these lines is shown in the patent to Houston, 2,120,250, dated June 14, 1938.

In the Houston airfoil, there is shown an airfoil structure which is extremely thin and highly cambered having high lift at low speed for take-offs and landings and upon reaching the desired altitude variable to assume a configuration affording a design to allow maximum air speed. The desired variations are accomplished by inflating an impermeable envelope which is mounted in surrounding enveloping relation to the airfoil.

Many of the prior art airfoils fail to consider the pressure differential on opposite sides of an envelope which is disposed on or around the sustaining airfoil and indicate only that the envelope may be distended by positive pressure or linkage means to vary the lift characteristics of the airfoil. It is quite apparent that a considerable pressure differential will develop on opposite sides of any supplemental member used to vary the lift characteristics of a sustaining airfoil during passage of the same through the air. If no consideration or compensation is given to the problem of the differential pressures developed, any envelope or similar type arrangement used on a sustaining airfoil would most probably be torn away by the differential pressure developed and have absolutely no value insofar as varying the lift characteristics or aerodynamic cross sectional configuration of the wing is concerned. The foregoing is of considerable importance in the design of an airfoil incorporating a controllable lift variable into the structure.

The above disadvantages are completely eliminated in the present invention which has as its primary purpose the provision of a supplemental airfoil mounted on the sustaining airfoil of an engine driven aircraft which is movable relative to the sustaining airfoil to vary the aerodynamic cross sectional configuration and lift characteristics thereof.

Another object of the invention is the provision of an auxiliary airfoil in the form of an elastomeric membrane mounted in generally overlying relation to a sustaining airfoil on an engine driven aircraft whereby the same is normally in intimate contact with a sustaining airfoil.

Another object of the invention is the provision of a sustaining airfoil for engine driven aircraft having a supplemental airfoil mounted thereon which is distendable during movement of the airfoil through the air and further includes means to control the amount of distention of the supplemental airfoil relative to the sustaining airfoil.

Another object of the invention is a sustaining airfoil for engine driven aircraft including a distendable supplemental airfoil mounted on the sustaining airfoil and control means whereby the amount of distention between the supplemental airfoil and the sustaining airfoil may be selectively controlled to control the flight path of the aircraft.

Other objects and advantages of the invention will become apparent during the course of the following detailed description.

In the accompanying drawings, forming a part of this application and in which like numerals are employed to designate like parts throughout the same, FIGURE 1 illustrates one type of aircraft on which the airfoil construction of the present invention can be used, FIGURE 2 is an enlarged fragmentary sectional view of the aircraft shown in FIGURE 1 illustrating control means used to vary the lift characteristics of the sustaining airfoil, FIGURE 3 is an enlarged fragmentary sectional view taken on lines 3—3 of FIGURE 1 illustrating the cross sectional configuration of one of the sustaining airfoils when the aircraft is in a range of relatively high speeds, FIGURE 4 is a view similar to FIGURE 3 illustrating the configuration of the airfoil when increased lift is desired and showing the supplemental airfoil distended and spaced from the upper surface of the sustaining airfoil, FIGURE 5 is an enlarged fragmentary sectional view illustrating the mounting of one of the vacuum producing means which controls distention of the supplemental airfoil, FIGURES 6 through 9 disclose another embodiment of the invention wherein the airfoil structure is applied to rotary wing aircraft.

Referring to the drawings in detail, and particularly FIGURES 1 through 5, there is shown an aircraft indicated generally by reference numeral 10 having fixed airfoils 11 and 12 positioned on opposite sides of a fuselage 13 and extending therefrom in horizontally aligned relation. Airfoils 11 and 12 have the usual aerodynamic cross sectional configuration and in one embodiment of the invention include the usual aileron members positioned adjacent the outer ends thereof.

It is well known to those skilled in the art that in order to change the lift characteristics of a conventional airfoil, the angle of attack must be varied which is brought about by controlling the attitude of the aircraft utilizing the elevator controls. In an aircraft utilizing the airfoil construction of the present invention, a change in attitude of the aircraft is not necessarily required in order to vary the lift characteristics of the airfoil.

As shown in FIGURES 3 and 4, airfoil 11 comprises the usual and substantially conventional type of airfoil having upper and lower surfaces 14 and 15 and leading and trailing edges 16 and 17. Mounted on the upper surface 14 of each of the airfoils 11 and 12, 11 only being shown in FIGURES 3 and 4, is a supplemental airfoil preferably formed of an elastomeric material flexible in nature. The supplemental airfoil, indicated by reference numeral 18, normally occupies the position shown in FIGURE 3 relative to the sustaining airfoils 11 and 12 wherein the same is applied in a taut condition to be in intimate face-to-face contact with the upper surface 14 of the sustaining airfoil. When the aircraft 10 is at rest, the supplemental airfoils 18 will be in the position shown in FIGURE 3 on each of the sustaining airfoils 11 and 12. However, during movement of the aircraft through a fluid medium, air, the flow of air over the sustaining airfoils 11 and 12 which have an aerodynamic cross sectional configuration create a differential pressure on opposite sides thereof to provide the necessary lift to sustain the aircraft in flight. In the subject airfoil structure, movement of the sustaining airfoils 11 and 12 through a fluid medium also creates a pressure differential on opposite sides of the supplemental airfoil 18 whereby, due to the elastic nature of the supplemental airfoils 18, the same is distendable and movable relative to the upper surface of the sustaining airfoils 11 and 12. Distention of the supplemental airfoils 18 changes the aerodynamic configuration of the sustaining airfoils 11 and 12 to provide increased lift at any given velocity. However, this is a self-regenerative situation since an increase in thickness of the cross sectional configuration of the sustaining airfoils will further decrease the pressure on the upper surface of the flexible supplemental airfoils 18 whereby the same will be distended even further from the upper surfaces 14 of the sustaining airfoils 11 and 12. In order to control the degree of distention of the supplemental airfoils 18 relative to the upper surfaces 14 of the sustaining airfoils 11 and 12, there is provided means in the form of a conduit 19 in communication selectively with vacuum producing and controlling means whereby the pressure differential on opposite sides of the supplemental airfoils 18 will be controlled to the extent that the distention of the same is prevented during flight to maintain the airfoil configuration shown in FIGURE 3 or controlled to allow partial distention of the supplemental airfoils 18 to provide the aerodynamic configuration of the airfoil as shown in FIGURE 4, for take-offs and landings or other relatively low speed operations.

In the embodiment of the invention as shown in FIGURES 1 through 5, the conduits 19 terminate at one end in openings in the upper surfaces 14 of airfoils 11 and 12 and at the other end communicate with valves which are operable to control the vacuum drawn through conduits 19 by the vacuum producing means to effect control of relative movement of the distendable supplemental airfoils 18. The valves indicated by reference character V can be manually or automatically controlled and are operable to communicate the conduits 19 with branch conduits 20 extending from a main conduit 21 connected to the intake manifold of an internal combustion engine used to provide a source of motive power for the aircraft. It will be readily apparent that the foregoing-described arrangement is equally suitable for use with aircraft whose motive power is derived from a reaction motor. In that event, the main conduit 21 is in communication with the compressor intake of the reaction motor whereby a vacuum can be drawn through line 21, branch lines 20 and conduits 19 to maintain selectively the supplemental airfoils 18 in intimate contact with the upper surface 14 of airfoils 11 and 12. During take-off procedure of the aircraft, the aircraft has no forward motion initially and it is desirable to maintain the supplemental airfoils 18 in the position shown in FIGURE 3 with respect to the upper surface 14 of airfoils 11 and 12. This is accomplished by operation of valves V to communicate conduits 19 through branch lines 20 and main line 21 to the vacuum producing portion of the engine used in the aircraft, be it internal combustion or reaction type motor. As the aircraft gains headway and air readily flows over the airfoil surfaces, the valves V are operated to vary the degree of vacuum passing through conduits 19 whereby the flexible supplemental airfoils 18 will be allowed to distend in a controlled manner and move relative to the upper surfaces 14 of airfoils 11 and 12, thereby increasing the lift characteristics of the airfoils to provide a more rapid and efficient take-off of the aircraft so that the same will become airborne within considerably less distance than that required for aircraft with conventional airfoil constructions.

In addition to the utilization of the vacuum producing portions of the engine used to provide motive power for the aircraft 10, there is provided alternate vacuum producing means in the form of venturis 22 and 23 which are mounted for universal movement on the aircraft, in the case of FIGURES 1 through 5, on the fuselage 13, which can be selectively placed in communication with conduits 19 by operation of valves V. The venturis 22 and 23 are mounted in streamlined struts which extend downwardly from the underside of the fuselage 13 of the aircraft 10. However, it is readily understood that the venturis may be positioned at any suitable location on the aircraft where they would not interfere with normal operation thereof. The struts which are indicated by reference numerals 24 and 25 are hollow and extending therethrough are support conduits 26 and 27 which, in addition to supporting the venturis 22 and 23 in the struts 24 and 25, also place the venturi passages in communication with flexible conduits 28 and 29. Operation of valves V will communicate the conduits 28 and 29 with conduits 19 whereby the pressure differential created by the venturi action of venturis 22 and 23 will effect the relative movement of supplemental airfoils 18 relative to the upper surfaces 14 of sustaining airfoils 11 and 12. Supporting conduits 26 and 27 extend through bushings 30 and 31 and are rotatable therein. Bushings 30 and 31 are fixed to opposite ends of a tie bar 32 which connects the conduits 26 and 27. As previously stated, venturis 22 and 23 are universally mounted in struts 24 and 25. This is accomplished by the ball and socket connection 33 and 34 at each end of the struts 24 and 25. Venturis 22 and 23 are movable about an axis transversely of the aircraft 10 upon movement of tie bar 32 and in a direction towards the nose or tail portion, not shown, of the aircraft. Movement of tie bar 32 causes simultaneous movement of venturis 22 and 23 whereby presentation of the inlets 35 and 36 of each respectively to the airstream can be varied. When valves V place conduits 19 in communication with flexible conduits 28 and 29 and support conduits 26 and 27, the pressure differential created by the venturi action of venturis 22 and 23 will maintain supplemental airfoils 18 in intimate contact with the upper surfaces 14 of airfoils 11 and 12. However, movement of the tie bar 32 to effect movement of the venturis 22 and 23 relative to the airstream will vary the differential pressure created thereby and subsequently vary the differential pressure created on opposite sides of the supplemental airfoil 18. The variation in the differential pressure created will of course allow controlled relative movement between supplemental airfoils 18 and the upper surface 14 of sustaining airfoils 11 and 12 whereby the lift characteristics of the sustaining airfoils 11 and 12 can be selectively varied.

In addition to movement of venturis 22 and 23 about an axis laterally of the aircraft 10, the same are also movable about an axis perpendicular to the longitudinal axis of the aircraft independently of each other. As set forth, support conduits 26 and 27 are rotatably mounted in bushings 30 and 31 and have fixed thereto collars 37 and 38. Control means in the form of levers, cables or the like indicated by reference numerals 39 and 40 respectively are secured to collars 37 and 38 and upon operation of suitable control means, not shown, in the cockpit of the aircraft, the operator of the same can rotate one or the other of venturis 22, 23 selectively. It will be apparent that rotation of venturis 22 and 23 in a direction transversely of the direction of flight of the aircraft will cause a variation in the differential in pressure created by the said venturis whereby when the same are in communication with conduits 19 will cause a variation in the relative movement between supplemental airfoils 18 and the upper surfaces 14 of sustaining airfoils 11 and 12. By selectively operating the controls 39 and 40, the operator of the aircraft can cause selective controlled distention of either of the supplemental airfoils 18 relative to the upper surfaces 14 of either sustaining airfoil 11 or 12 to thereby increase the lift characteristics of one airfoil to an extent greater than the lift characteristics of the other to effect or prevent aircraft roll about its longitudinal axis. Such control will eliminate the need for aileron controls such as those indicated by reference character A in FIGURES 3 and 4.

It will be apparent from the foregoing description of the aircraft shown in FIGURES 1 through 5 that the use of a distendable flexible supplemental airfoil will allow control of the aircraft in a manner hitherto impossible.

The operation of an aircraft provided with the airfoil construction shown in FIGURES 1 through 4 of the drawings will be apparent from the foregoing description. When the aircraft 10 is at the take-off position but has not yet started to move, the supplemental airfoils 18, due to the characteristic of the material used, which can be elastomeric or flexible in nature, will, due to the tautness of application, be maintained tightly against the upper surface 14 of airfoils 11 and 12 in the manner shown in FIGURE 3 of the drawings. When forward movement of the aircraft increases, as during take-off, the passage of air over the upper and lower surfaces 14 and 15 of airfoils 11 and 12 will create a differential pressure on opposite sides thereof to cause the supplemental airfoils 18 to become distended and move relative to the upper surfaces 14 of each of the airfoils. Since, as previously mentioned, the distention of the supplemental airfoils 18 is self-regenerative, uncontrolled distention of the same would result in their being ruptured or torn from the airfoil. Controlled distention of supplemental airfoils 18 is effected by valves V which communicate the areas between the supplemental airfoils 18 and the upper surfaces 14 of airfoils 11 and 12 to the intake manifold or compressor intake of the engine used to provide motive power for the aircraft 10 or to venturis 22 and 23. Valves V communicate conduits 19 to the intake manifold or compressor intake of the engine, not shown, through branch conduits 20 and main conduit 21. The valves V are operable to regulate the vacuum drawn through conduits 19 whereby effective control of the distention of supplemental airfoils 18 is accomplished. Airfoils 18 are gradually distended to effect a stepless variation in the cross sectional configuration of the airfoils 11 and 12, thereby increasing the lift characteristics thereof and allowing a shorter take-off run for the aircraft 10. When sufficient altitude or forward speed of the aircraft is reached, valves V are operated to switch communication of conduits 19 from the engine manifold or compressor intake to venturis 22 and 23 through support conduits 26 and 27 and flexible conduits 28 and 29. The movement of air through venturis 22 and 23 during the flight of the aircraft will produce a differential in pressure sufficient to overcome the differential in pressure on opposite sides of airfoils 11 and 12 to maintain supplemental airfoils 18 in intimate contact with the upper surfaces 14 of the airfoils 11 and 12 as shown in FIGURE 3. Since venturis 22 and 23 are universally movable relative to the aircraft fuselage 13 by means previously described, it will be apparent that the effect produced thereby can be varied by the operator of the aircraft to control the relative position of supplemental airfoils 18 with respect to the upper surfaces 14 of airfoils 11 and 12, whereby the lift characteristics of these airfoils can be altered. If it is desired to change the flight path of the aircraft 10, one of the venturis 22 or 23 may be rotated in a direction transversely of the line of flight of the aircraft to lessen the venturi effect created thereby and consequently lessen the effect on one of the distendable supplemental airfoils 18, whereby the same can be distended in a controlled manner and moved relative to the upper surface of one of the airfoils 11 or 12 to increase the lift characteristics thereof to an extent greater than the other airfoil whereby movement of the aircraft in roll instead of straight and level is effected, or whereby roll about a longitudinal axis is prevented.

The airfoil structure of the present invention can also be applied to rotary wing aircraft, for example, helicopters, which are normally provided with a rotor comprising a driven hub 41 and a plurality of sustaining airfoils 42 fixed at one end to hub 41 and extending radially outwardly thereof.

In the normal operation of a helicopter, it is known that during the take-off procedure the rotors or rotor are driven by the engines supplying the motive power thereto and the pitch of the rotor blade is changed to provide the desired lift characteristics to each of the sustaining airfoils, comprising the rotor whereby the necessary lift allows the helicopter to take off in a substantially vertical direction. To effect directional flight of the helicopter, the axis of rotation of the rotors is tilted in the direction it is desired to have the helicopter travel and the rotors are also provided with cyclic pitch control whereby the pitch of the blades or rotor airfoils is varied cyclically whereby deviation of the flight path can be effected selectively, as is well-known.

The structure of the present invention as applied to rotary wing aircraft comprises auxiliary airfoils 43 mounted on the upper surfaces 44 of each of the rotary sustaining airfoils 42. Supplemental airfoils 43 are, as in the cast of the structure described with respect to FIGURES 1 through 4 of the drawings, formed of an elastomeric material or the like which is flexible and has the property of being distendable whereby the same can move relative to the upper surface 44 of each of the rotor blades 42. As in the case of fixed airfoil aircraft, lift is derived in a rotary wing aircraft by the differential in pressure created on opposite sides of the sustaining airfoil during movement of the same through the air. This same movement creates a differential pressure on opposite sides of the supplemental airfoils 43 whereby distention of the same will occur during rotary movement of the rotor blades or sustaining airfoils. In order to control the relative movement between the supplemental airfoils 43 and the upper surfaces 44 of the rotor blades or sustaining airfoils 42, means are provided whereby the differential pressure can be controlled on opposite sides of the supplemental airfoils 43 and takes the form of venturis fixed to the free end of each of the rotor blades 42, one of which is shown in FIGURES 6 and 8. Conduits 46 having branch lines 47 communicate the venturis 45 with the area between the upper surface 44 of each of the rotor blades 42 and the supplemental airfoils 43, whereby the vacuum effect created by the venturis during movement of the rotor blades through the air creates a differential in pressure on opposite sides of the supplemental airfoils 43 sufficient to maintain the same in intimate contact with the upper surface 44 of each of the rotor blades 42. Conduits 46 in each of the rotor blades or sustaining airfoils 42 are in communication with concentrically or otherwise separately disposed fluid passages 48 in hub 41. Bleed conduits 49 are in communication with the fluid passages 48 in rotor 41 and terminate in a bleed valve, not shown, which is controlled by the operator of the aircraft whereby the effect of the venturis 45 can be controlled to allow selective controlled distention of supplemental airfoils 43 relative to the upper surfaces 44 of rotor blades or sustaining airfoils 42.

In the operation of a helicopter provided with the airfoil structure of the present invention, the supplemental airfoils 43 will normally occupy the position relative to the upper surface 44 of each of the rotor blades or sustaining airfoils 42 as shown in FIGURE 7a when the rotor is at rest. The foregoing is caused by the elastic properties of the material from which the supplemental airfoils 43 are comprised and the taut manner in which the same is applied to the surface 44 of the rotor blades 42. Upon rotation of the rotor hub 41 and blades 42, the differential is pressure created on opposite sides thereof would tend to cause distention of supplemental airfoils 43 and, if permitted, would thereby change the lift characteristics of the rotor blades or sustaining airfoils 42. The above-described distention of supplemental airfoils 43 occurs immediately after rotor blades 42 begin to rotate unless the distention is opposed by suitable control means. However, it is desirable that the rotor blades 42 attain a relatively high rotational speed before the lift characteristics thereof are increased to enhance vertical take-off movement of the helicopter to best utilize the energy stored in the rotating parts. The supplemental airfoils 43 are maintained in the position shown in FIGURE 7a relative to the surface 44 of the rotor blades or sustaining airfoils 42 by the action of venturis 45 which through conduits 46 and 47 create a pressure differential in the area between the surface 44 of rotor blades 42 and supplemental airfoils 43 sufficient to maintain the same in intimate contact with the surface 44 of each of the airfoils 42 by being at least equal to the amount of pressure reduction on the top surface of auxiliary airfoil surface 43. The pilot-controlled bleed valves, whereby the effect of venturis 45 is indirectly controlled through the communication therewith through conduits 49, fluid passages 48 and conduits 46, would be opened in predetermined amounts to allow stepless changes in airfoil configuration caused by distention of supplemental airfoils 43 relative to the surfaces 44 of rotor blades or sustaining airfoils 42. As the supplemental airfoils 43 distend and the desired lift characteristics of the rotor blades or sustaining airfoils 42 is attained, the pilot-controlled bleed valves are operated to maintain the desired distention of the supplemental airfoils 43 whereby take-off of the helicoptor is completed without any mechanical or physical change in the pitch-angle of the rotor blades 42. When the helicopter has reached the desired operating altitude and horizontal motion is desired, the pilot-controlled bleed valves are operated in a manner to cause sufficient distention of supplemental airfoils 43 such that the lift characteristics of the rotor blades and their supplemental airfoils 43 will cause the helicopter to hold a desired flight altitude. The pilot then tilts the axis of rotation of the rotating airfoils towards the direction in which it is desired to travel. Since a part of the lifting force is converted to provide a horizontal component of motion, it will at this point be necessary that the pilot increase the throttle setting to compensate for this loss in lift, and it may also be necessary to again adjust the air-bleed valves to trim the amount of distention to be permitted in the supplemental airfoils 43 so as to be able to maintain a desired relatively constant altitude.

Here it can be seen that the distention of supplemental airfoils 43 is approximately the same for each blade when the helicopter is ascending or descending in a true vertical path with no wind, or when hovering in still air. When in horizontal motion, however, these supplemental airfoils distend in unequal amounts depending upon their direction of motion with relation to the horizontal motion of the air supporting the helicopter. This constantly varying distention of supplemental airfoils 43 provides essentially the same effect as that obtained with conventional helicopter constructions using various forms of cyclical-pitch-control wherein the pitch is relatively low on the forward moving blades and relatively high on the rearward moving blades. In the present invention the venturi mounted on the tip of the forward moving blade is moving with a substantially greater air-speed than would be the case if the helicopter were stationary with reference to its supporting air. In other words, its true air-speed is its normal tip rotational speed plus the horizontal air-speed of the helicopter proper. At this higher relative air-speed the venturi develops a greater vacuum force to oppose distention of supplemental airfoil 43 causing it to take a configuration of lesser lift, i.e., less thickness, but at the same time being capable of providing essentially the same amount of lift because of the relative increase in air speed on the forward moving side. Here it will be seen that the amount of distention in supplemental airfoils 43 is essentially "normal" for any given constant altitude only when the blade tips are pointing forward or rearward, and that the references forward and rearward apply only to the direction the helicopter is moving—not necessarily the direction its main fuselage is pointing, it being clear that a helicopter is capable of moving in any direction whether it be forward, rearward, or even sideways.

In the case of rearward moving blades, i.e., when the forward moving blades pass around on the opposite side of the helicopter so as to be moving in a direction opposite to that in which the helicopter is moving, the venturi at the tip is moving through the air at a relatively slower velocity. This slower velocity is its normal rotational velocity minus the horizontal velocity of the helicopter proper (as contrasted with the velocity of the forward moving blades which is the normal rotational velocity plus the velocity of the helicopter proper). Thus, having a relatively lesser air velocity, the rearward moving venturi develop a lesser vacuum force to oppose the distention of supplemental air foils 43 with the result that distention is proportionately greater than that which would exist if the helipcopter had no horizontal motion with reference to air in which it is supported. Since the distention or thickness is then greater on a rearward moving blade, a greater amount of lift capability exists which is exactly offset by the decreased relative air velocity such that the total lift developed during rearward motion is essentially identical with the total lift developed on the forward moving side. The helicoper is, therefore, laterally stable.

This cyclical lift variation contrasts with conventional cyclical pitch angle variation in that the supplemental airfoils 43 are constantly distended and contracted once each during each complete rotation of the rotary airfoil hub, being contracted below some median value while moving forward as a part of the horizontal motion of the helicopter, and being distended above the same median value during that period of the cycle when the blade is moving in the opposite direction of helicopter motion. The median value is that amount of distention which provides the most favorable combination of power and lift to maintain a relatively constant altitude.

It will be apparent from the foregoing that the undesirable characteristic noise created by rotational movement of the sustaining airfoils in conventional helicopter aircraft will be substantially eliminated. This is caused by the fact that each rotor blade in the rotor of a conventional helicopter during its cyclic pitch change passes through a low and high pressure area created by the blade immediately preceding. In addition, the rotor blades of a helicopter constructed according to the teachings of the present invention, are not subjected to the abnormal stress induced by the violent change in aerodynamic loadings on the rotor blades which could create fatigue problems.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Having thus described my invention, I claim:

1. In a sustaining airfoil for engine driven aircraft including upper and lower surfaces and having an aerodynamic cross sectional configuration, a flexible supplemental airfoil surface mounted in overlying relation on the upper surface only of said sustaining airfoil, said supplemental airfoil being distendable in response to differential pressure on opposite sides thereof created by movement of the sustaining airfoil through a fluid medium to cause relative movement between the same and the upper surface of said sustaining airfoil, and vacuum control means in communication with the under side of said flexible supplemental airfoil and operable to regulate the relative movement between said supplemental airfoil and the upper surface of said sustaining airfoil to change the aerodynamic cross sectional configuration and lift characteristics of said sustaining airfoil.

2. In a sustaining airfoil for aircraft the combination comprising a flexible supplemental airfoil mounted on said sustaining airfoil, said supplemental airfoil positioned in overlying relation to said sustaining airfoil, said supplemental airfoil movable relative to said sustaining airfoil in response to a pressure differential on opposite sides thereof created by passage of said sustaining airfoil through a fluid medium, and vacuum control means operable to vary the pressure differential between opposite sides of said supplemental airfoil to regulate relative movement between the same and said sustaining airfoil, said vacuum control means maintaining a negative control pressure beneath said flexible supplemental airfoil at all times during movement of the sustaining airfoil through said fluid medium.

3. In a sustaining airfoil for aircraft including upper and lower surfaces and having an aerodynamic cross sectional shape, a distendable supplemental airfoil surface mounted in overlying relation on the upper surface only of said sustaining airfoil, said distendable airfoil surface movable away from the upper surface of the sustaining airfoil during movement of the same through a fluid medium, and constantly operating vacuum control means communicating with the under surface of said distendable airfoil surface to regulate the degree of movement of the same away from the upper surface of the sustaining airfoil for varying the lift characteristics of the sustaining airfoil in a controlled manner.

4. In a sustaining airfoil for aircraft including upper and lower surfaces and having an aerodynamic cross sectional configuration, a distendable flexible supplemental airfoil mounted in overlying relation to the upper surface only of said sustaining airfoil, said supplemental airfoil distendable by differential pressure on opposite sides thereof effected during movement of said sustaining airfoil through air, means operable during movement of the sustaining airfoil through air to create a negative control pressure beneath said supplemental airfoil and between it and the upper surface of the sustaining airfoil, and control means for the last-named means operable to regulate the degree of vacuum beneath the supplemental airfoil and thereby providing control over the degree of distention thereof.

5. In a sustaining airfoil for aircraft, a supplemental airfoil comprising a flexible distendable member mounted on the sustaining airfoil in generally overlying relation to the upper surface thereof, said supplemental airfoil adapted to rise and fall relative to the sustaining airfoil in response to a pressure differential on opposite sides of the supplemental airfoil caused by movement of the sustaining airfoil through air, means operable during passage of the sustaining airfoil through air to create a control vacuum between the supplemental airfoil and the upper surface of the sustaining airfoil, and separate means to regulate the last-named means and thereby regulate the degree of said vacuum and the degree of distention of the supplemental airfoil to control the lift characteristics thereof.

6. In a sustaining airfoil for engine driven aircraft including upper and lower surfaces and having an aerodynamic cross sectional configuration, a supplemental airfoil comprising an elastomeric member mounted in overlying relation to and in intimate contact with the upper surface only of said sustaining airfoil, said supplemental airfoil distendable by differential pressure between opposite sides thereof effected during movement of said sustaining airfoil through a fluid medium to cause movement of said supplemental airfoil relative to the upper surface of said sustaining airfoil, first means operable to create a pressure differential between opposite sides of said supplemental airfoil to maintain the same in intimate contact with the upper surface of said sustaining airfoil during initial movement of the same through a fluid medium, second means operable to create a pressure differential between opposite sides of said supplemental airfoil to maintain the same in intimate contact with the upper surface of said sustaining airfoil when the sustaining airfoil exceeds a predetermined rate of travel through the fluid medium, control means operable to cause cessation of operation of said first pressure differential creating means and effect operation of said second pressure differential creating means, and said second pressure differential creating means further operable to regulate the pressure differential created thereby between opposite sides of said supplemental airfoil to vary relative movement between the same and the upper surface of said sustaining airfoil.

7. In a sustaining airfoil for aircraft as defined in claim 6 wherein said sustaining airfoil further includes leading and trailing edges, said elastomeric supplemental airfoil secured to the leading and trailing edges of said sustaining airfoil and extending over a major portion of only the upper surface thereof.

8. In a sustaining airfoil for engine driven aircraft as defined in claim 6, said first pressure differential creating means comprises conduits in communication between the intake manifold of the engine and the area adjacent the upper surface of said sustaining airfoil.

9. In a sustaining airfoil for engine driven aircraft as defined in claim 6, said second pressure differential creating means comprises venturis mounted on the aircraft to project into the airstream during movement of the same, and conduits in communication with said venturis and the area adjacent the upper surface of said sustaining airfoil.

10. In a sustaining airfoil for engine driven aircraft as defined in claim 6, said control means operable to cause cessation of said first pressure differential creating means and effect operation of said second pressure differential creating means comprises valve means, said valve means including portions defining a passage therethrough and operable to effect communication between the first means and the area adjacent the upper surface of said sustaining airfoil and the second means and the upper surface of said sustaining airfoil selectively.

11. In a sustaining airfoil for reaction motor driven aircraft having upper and lower surfaces and an aerodynamic cross sectional configuration, a supplemental airfoil comprising an elastomeric member mounted in overlying relation to and in intimate contact with the upper surface only of said sustaining airfoil, said supplemental airfoil distendable by differential pressure between opposite sides thereof created during movement of said sustaining airfoil through a fluid medium to cause movement of said supplemental airfoil relative to the upper surface of said sustaining airfoil, means to effect communication between the compressor intake of the reaction motor and the area adjacent the upper surface of said sustaining airfoil to create a pressure differential to maintain said supplemental airfoil in intimate contact with the sustaining airfoil, venturi means on the aircraft to project into the airstream during movement of the same through the fluid medium, means to effect communication between said venturi and the area adjacent the upper surface of said sustaining airfoil to create a pressure differential between opposite sides of said supplemental airfoil to maintain the same in intimate contact with the upper surface of said sustaining airfoil, valve means operable to selectively effect communication between the compressor intake and the area adjacent the upper surface of said sustaining airfoil and between said venturi and the area adjacent the upper surface of said sustaining airfoil, and said venturi means movable to vary the venturi effect thereof to control the pressure differential on opposite sides of said supplemental airfoil.

12. In an engine driven aircraft having a fuselage and a pair of horizontally aligned sustaining airfoils fixed to opposite sides of said fuselage the combination comprising a flexible distendable supplemental airfoil mounted on each of said sustaining airfoils, each of said supplemental airfoils distendable to move relative to said sustaining airfoils in response to a differential in pressure on opposite sides thereof during movement of the sustaining airfoils through a fluid medium, means on said aircraft operable to vary the pressure differential on opposite sides of said supplemental airfoils selectively to effect differential relative movement between each of said supplemental airfoils and a respective sustaining airfoil to vary the lift characteristics thereof to effect lateral deviation of the aircraft from its flight path.

13. In an engine driven aircraft having rotary sustaining airfoils of aerodynamic cross sectional configuration the combination comprising a hub, said sustaining airfoil fixed at one end to said hub and extending radially outwardly therefrom, said sustaining airfoils being hollow and including a supplemental flexible airfoil mounted on an exterior surface thereof, said supplemental airfoils distendable and movable relative to the said exterior surfaces of said sustaining airfoils in response to a differential pressure on opposite sides thereof created by rotary movement of said sustaining airfoils through a fluid medium, means to communicate the area adjacent the exterior surface of said sustaining airfoils on which said supplemental airfoils are mounted with vacuum producing means to normally maintain said supplemental airfoils in intimate contact with the exterior surface of the sustaining airfoils, and control means operable to vary the vacuum produced by said vacuum producing means to allow controlled relative movement between said supplemental airfoils and the exterior surface of said sustaining airfoils whereby the aerodynamic cross sectional configuration and lift characteristics of the sustaining airfoils are altered.

14. In an engine driven aircraft having rotary sustaining airfoils as defined in claim 13 wherein said hub includes portions defining a plurality of fluid passages, said fluid passages being in communication with said vacuum producing means, bleed valve means in communication with the fluid passages in said hub, and said bleed valve means operable to control the vacuum produced by said vacuum producing means.

15. In an engine driven aircraft having rotary sustaining airfoils as defined in claim 13 said vacuum producing means comprise venturis mounted on said sustaining airfoils.

16. In an engine driven aircraft having rotary sustaining airfoils as defined in claim 15 said venturis are fixed to the free end of each of said sustaining airfoils.

17. In an engine driven aircraft having rotary sustaining airfoils with an aerodynamic cross sectional configuration and including upper and lower surfaces the combination comprising supplemental flexible airfoils mounted on the upper surfaces only of said sustaining airfoils, said supplemental airfoils distendable and movable relative to the upper surfaces of said sustaining airfoils in response to a differential pressure on opposite sides thereof created by rotary movement of the sustaining airfoils through a fluid medium, vacuum producing means on said sustaining airfoils in communication with the area adjacent the upper surfaces thereof to normally maintain said supplemental airfoils mounted thereon in intimate contact therewith, and control means to vary the vacuum produced by said vacuum producing means to allow controlled relative movement between said supplemental airfoils and the upper surfaces of said sustaining airfoils whereby the aerodynamic cross sectional configuration and lift characteristics thereof are altered.

18. In an engine driven aircraft having rotary sustaining airfoils as defined in claim 17 said sustaining airfoils including leading and trailing edges, said supplemental airfoils secured to the leading and trailing edges only of said sustaining airfoils and extending in overlying relation over a major portion of the upper surface thereof.

19. In an engine driven aircraft having rotary sustaining airfoils of aerodynamic cross sectional configuration the combination comprising supplemental flexible airfoils mounted on said sustaining airfoils in overlying relation thereto, said supplemental airfoils distendable and movable relative to said sustaining airfoils in response to differential pressure on opposite sides thereof created by rotary movement of the sustaining airfoil through a fluid medium, vacuum producing means on said sustaining airfoils in communication with the area between the same and said supplemental airfoils to normally maintain the supplemental airfoils in intimate contact with the sustaining airfoils, and control means operable to vary the vacuum produced by said vacuum producing means to allow relative movement between said supplemental airfoils and said sustaining airfoils at selected points during rotation thereof to control the direction of flight of the aircraft.

20. In an engine driven aircraft having rotary sustaining airfoils of aerodynamic cross sectional configuration the combination comprising a hub, portions of said hub defining a plurality of internal passages therein, said sustaining airfoils each fixed at one end to said hub and extending radially outwardly therefrom and being circumferentially spaced apart, said sustaining airfoils having passage means therein in communication with a passage in said hub, a supplemental flexible airfoil mounted on an exterior surface of each of said sustaining airfoils, said supplemental airfoils distendable and movable relative to the said exterior surfaces of said sustaining airfoils in response to a differential in pressure on opposite sides thereof created by movement of said sustaining airfoils through a fluid medium, vacuum producing means on each of said sustaining airfoils in communication with the passage means therein, means to communicate the passage means in each of said sustaining airfoils with the area adjacent the exterior surface thereof on which said supplemental airfoils are mounted, control means in communication with the internal passages in said hub operable to vary the degree of vacuum in said passage means in said sustaining airfoils and in the area adjacent the exterior surfaces thereof on which said supplemental airfoils are mounted to control the distention thereof.

21. In an engine driven aircraft having a rotary hub and sustaining airfoils the combination including flexible distendable supplemental airfoils mounted on said sustaining airfoils, vacuum induced means to produce a pressure differential on opposite sides of said supplemental airfoils to normally maintain the same in contact with the sustaining airfoils during rotation thereof, means to control the pressure differential on the opposite sides of said supplemental airfoil to allow controlled distention thereof, said rotary hub and sustaining airfoils tiltable to control the direction of flight of the aircraft, and said pressure differential producing vacuum induced means responsive to the movement of flight of the aircraft and the movement of said sustaining airfoils to effect cyclic distention of said supplemental airfoils.

References Cited in the file of this patent

UNITED STATES PATENTS

| 1,791,233 | Brequet | Feb. 3, 1931 |
| 2,932,470 | Edkins | Apr. 12, 1960 |

FOREIGN PATENTS

| 396,462 | France | Jan. 27, 1909 |